INVENTOR.
DAVID A. BOURNE
BY Lester W. Clark
ATTORNEY

Dec. 13, 1966 D. A. BOURNE 3,292,149

IDENTIFICATION AND COMPARISON APPARATUS FOR CONTOUR PATTERNS SUCH AS FINGERPRINTS

Filed June 18, 1964 4 Sheets-Sheet 2

Dec. 13, 1966 D. A. BOURNE 3,292,149
IDENTIFICATION AND COMPARISON APPARATUS FOR CONTOUR PATTERNS SUCH AS FINGERPRINTS
Filed June 18, 1964 4 Sheets-Sheet 3

Dec. 13, 1966 D. A. BOURNE 3,292,149

IDENTIFICATION AND COMPARISON APPARATUS FOR CONTOUR PATTERNS SUCH AS FINGERPRINTS

Filed June 18, 1964 4 Sheets-Sheet 4

United States Patent Office 3,292,149

Patented Dec. 13, 1966

3,292,149

IDENTIFICATION AND COMPARISON APPARATUS FOR CONTOUR PATTERNS SUCH AS FINGERPRINTS

David A. Bourne, Chappaqua, N.Y., assignor to International Business Machines Corporation, New York, N.Y., a corporation of New York Filed June 18, 1964, Ser. No. 376,125
24 Claims. (Cl. 340—146.3)

Figure 1:
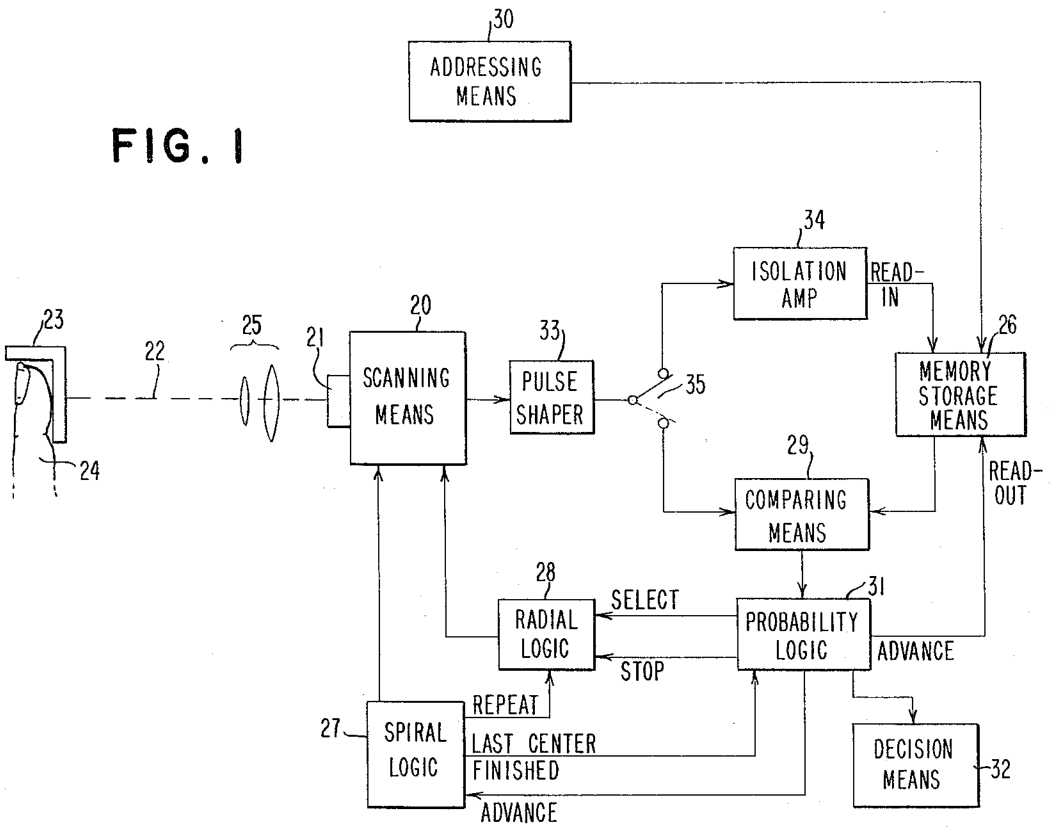

This invention relates to pattern identification and comparison, and more particularly relates to an apparatus for scanning an object having contour patterns or representations similar to contour patterns, and rendering a decision involving the identity of the object or the comparison with another object or record thereof. In one aspect thereof, the invention relates to the identification of individual human beings.

Contour patterns are well known from the map-making art as lines of equal elevation. However the concept has broader implications. In map-making, as aforesaid, the pattern of lines, often but not always constituting a large plurality of separate closed lines, represents topography. More broadly, and for purposes of definition of the present invention, contour lines consist of lines resembling those of contour maps, but not necessarily representing topography. For example, human fingerprints have a contour line pattern formed by the ridges thereon. But except for the fact that each ridge is slightly elevated from its local background, the pattern does not represent topography. Isothermal and Isobarometric maps also do not represent topography.

Since it is the pattern itself which the apparatus of the present invention operates upon in a broad range of applications, contour patterns shall be defined herein to mean generally curved patterns of lines on a surface, without particular reference to what the lines may happen to be or what the pattern may happen to represent.

It will be readily understood by those skilled in the art that contour lines are employed in diverse situations. For example, in reducing a sculpted clay model of a new automobile design to engineering drawings, contour lines are found on each curved surface and plotted on paper. Contour lines are employed in map-making in general, and as the example just given illustrates, the map-making can be of terrain or non-terrain surfaces. It can be of photographs. It can be representational of variables other than elevation, as already illustrated. It can be purely a pattern, as with fingerprints.

In many, if not all, of the instances where contour patterns are found or created, it is highly desirable to compare them. This can be map-matching in the appropriate examples above, or it can be identification of the pattern, as for example identification of a fingerprint.

In the following description of the invention and its advantages, particular attention will be paid to the important problem of identifying human beings, which problem is solved by the contour pattern identification and comparison apparatus of the present invention. However it should be understood that the invention relates more broadly to contour patterns in general, and occasional references and illustrations will be made herein below during discussion of the human identification aspects of the invention, to point out clearly how other contour pattern problems are solved by the invention.

It is highly desirable to have automatic means for identifying a human being. A tremendous number of individuals are checked by cumbersome methods every day in libraries, banks, plants, factories, classified areas, and by law enforcement agents. In general, the problem of ascertaining the identity of an individual is one of the most common faced in the everyday affairs of commerce, industry, and government.

Present means of identification are crude, time consuming, or both. For example, guards often must check credentials or badges at gates or at entrances to restricted areas, and a tremendous staff is thus needed to do even a cursory job of examining documents or correlating badge pictures to faces. For another example, police officers often must rely upon an individual's self-identification because the usual fingerprint methods are time-consuming. For yet another example, druggists are often duped into honoring a prescription for morphine having a forged medical doctors signature thereon. In these and many other equally diverse examples in everyday life, there are frequent undetected instances of using another individual's credentials and other forms of fraud despite the expenditure of a great deal of laborious identification labor.

What is clearly needed is a means of providing automatic identification of a submitting individual's identity, in any of the main types of identification that are possible. In different identification situations different of these main types of identification are required. For example, to enter a restricted area it may be sufficient to identify the submitting individual as one of the fixed group entitled to enter, that is, to determine that he is known, rather than who he is. In another situation, and to continue the restricted area example, it may be desirable to know who actually did enter from among those authorized. Thus identification there means being known to belong to a group, and additionally being known as to singular identity.

In another class of uses, and to continue the restricted area illustration, it may be necessary to identify the person individualy despite the fact that he is outside the original check-out universe. Thus in the example a person who is determined to be unknown vis-a-vis the universe of identities who are cleared to be admitted to the area, may have his identity determined by resort to a much larger universe that are not so cleared. In other words, without undue detention, it could be determined who a person is who tried to enter a restricted area and was determined not to be one of those so cleared. In this one illustration is shown three different types of identification, and also is suggested a number of additional uses for a means capable of determining such matters.

In addition to being flexible and automatic as aforesaid, the felt-need requires that such a means be capable of relying upon a central repository of known identities. This would answer the difficult problem posed by the multiplicity of branch offices of a bank, or the far-flung guard houses on a military installation, or the several gates to a plant location, or the many police stations within a single political jurisdiction, to cite just a few random examples. Thus in order to be really benefical, such a means ought to be capable of cutting down on far-flung personnel and duplication, and yet ought to minimize its own expense by resort to keeping the majority expense at a central location together with only relatively inexpensive equipment at the multiplicity of far-flung stations.

One other much wanted attribute is the ability to identify an individual by inspection of his person or some portion thereof directly or alternatively by inspection of some image record thereof, which latter, of course, ought to be possible in his physical personal absence. Clearly in police work, and in other situations, it may be just as desirable to identify from an image record as from life, and accordingly if equipment is to justify wide distribution it should be capable of handling both situations.

It has now been found that a broad range of problems can be handled by means of the concept of contour lines, and the equipment of the present invention. As will appear more fully hereinbelow, map-matching, engineering drawing identification, human identification, and other similar problems can be dealt with by means of the present invention.

It is accordingly a principal object of the present invention to provide automatic means for comparing a contour pattern to a second contour pattern in actual or record form.

Another object is to provide such means capable of identifying which of a known universe of contour patterns the tested pattern is, or is most nearly.

Another object is to provide such an apparatus adapted for human identification use, wherein an individual may be identified by scanning the contour pattern of certain of his externally observable anatomical features and comparing them to a universe of known individual's features.

Another object is to provide such means capable alternatively of so identifying the individual based upon scanning of the actual individual or scanning of an image record thereof.

Another object of the invention is to provide such a means wherein the scanned features consist specifically of epidermal patterns.

Another object of the invention is to provide such means wherein the fingerprints of the individual constiute the aforesaid patterns and features.

Another object of the invention is to provide means whereby a rapid and highly fraud-proof check may be made on the identity of an individual.

Another object of the invention is to provide means for automating the identification of individuals, particularly at entrances to restricted areas, so as to introduce speed and economy into the identification process.

Another object of the invention is to provide means for quickly classifying submitted individuals into known versus unknown, or admissible versus inadmissible, and the like categories.

Yet another object of the invention is to provide means for centralizing the major aspects of an individual identification process so as to allow feasibility of automatic identification at far-flung check-points.

Still another object of the invention is to provide means for identifying an individual by scanning a portion thereof wherein misalignment between the scanned portion and the scanning means does not deter successful completion of the identification process.

The foregoing and other objects, features and advantages of the invention will be apparent from the following more particular description of preferred embodiments of the invention, as illustrated in the accompanying drawings.

Figure 2:
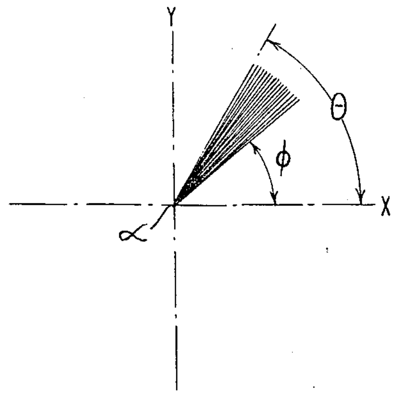
Figure 3:
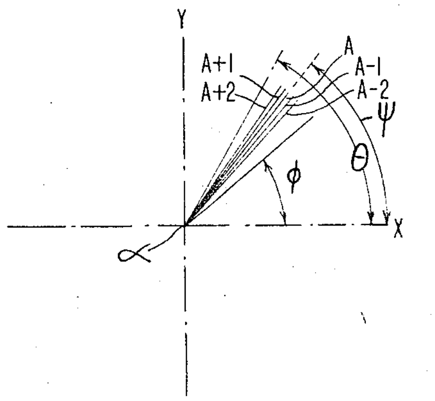
Figure 4:
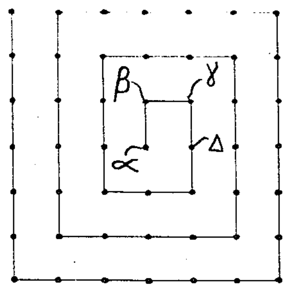
Figure 5:
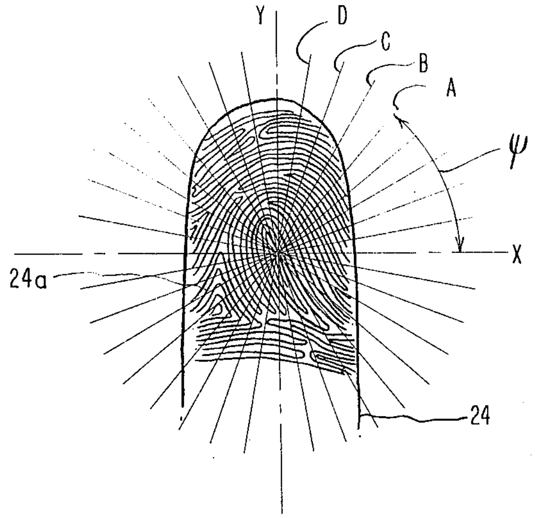
Figure 6:
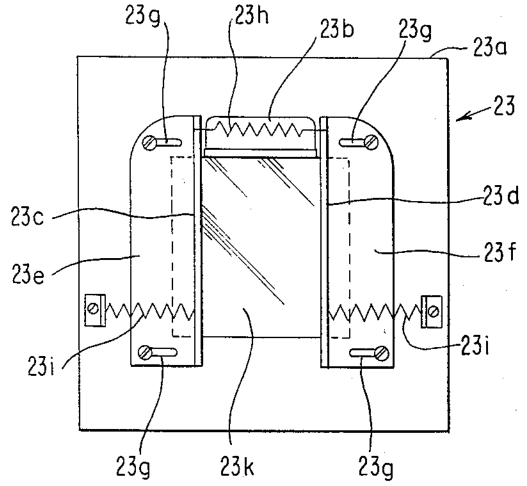
Figure 7:
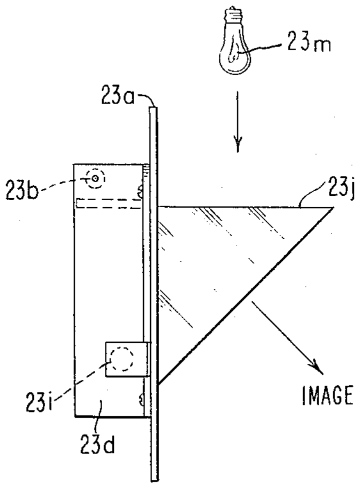
Figure 8:
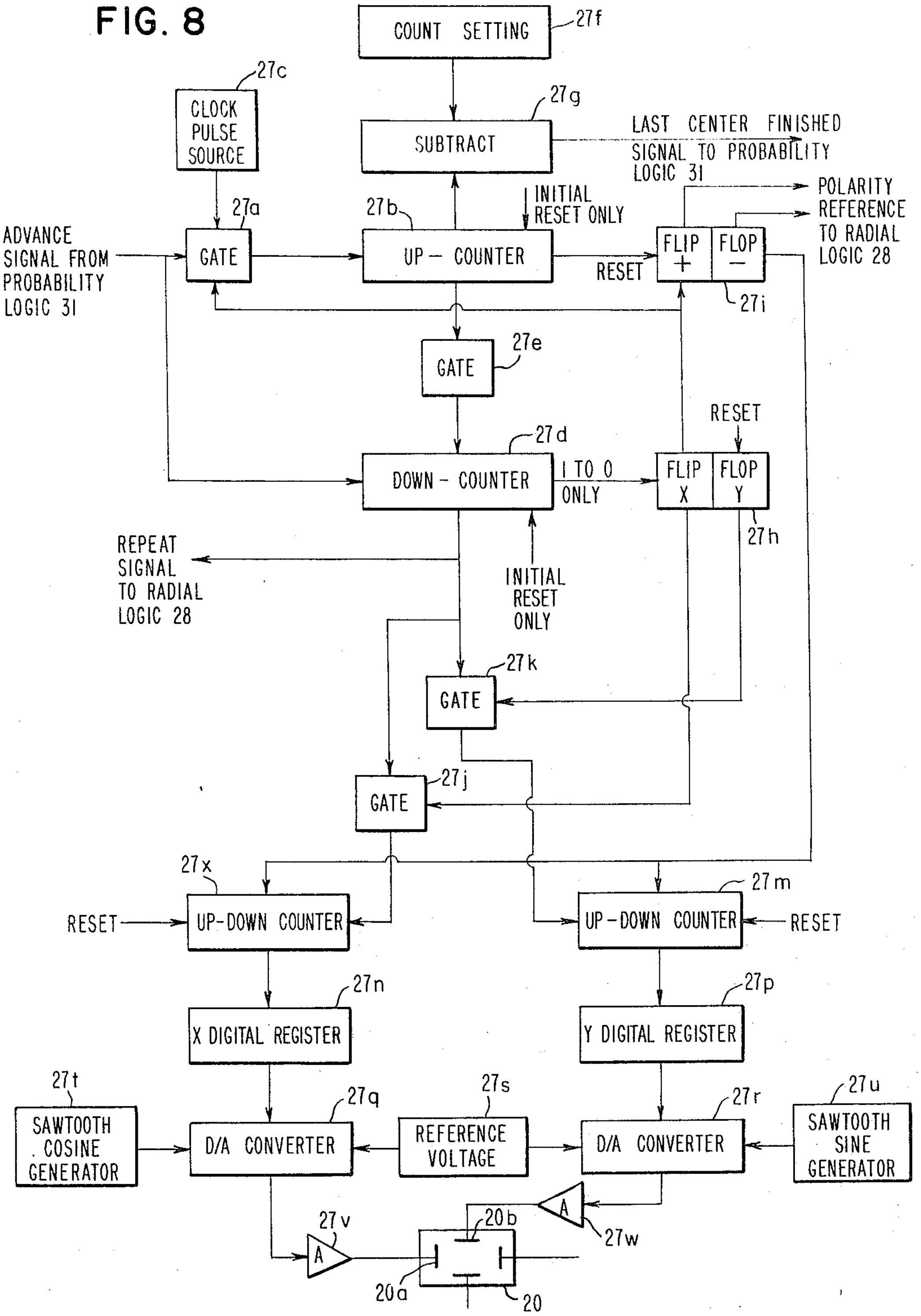
Figures 9, 10, 11:
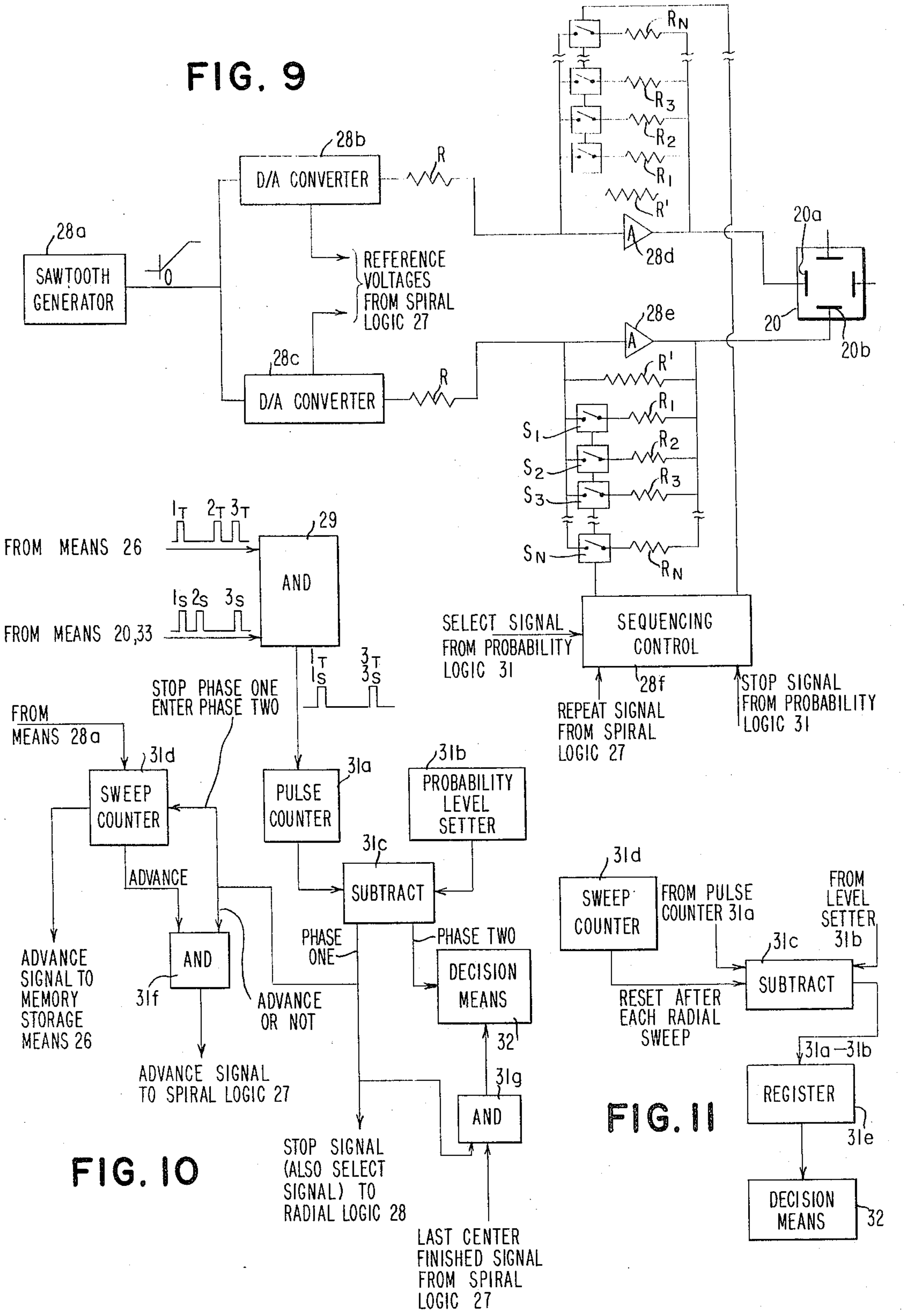

In the drawings:

FIG. 1 is a block diagram of a contuor pattern identification and comparison apparatus according to the invention and showing a schematic human finger being scanned thereby, FIG. 2 is a graphic representation of one mode of preliminary scanning practiced by the apparatus of FIG. 1, FIG. 3 is another graphic representation of the mode of scanning shown in FIG. 2, FIG. 4 is a graphic representation of one mode of movement of the scanning centers practiced by the apparatus of FIG. 1, FIG. 5 is a graphic representation of one mode of final scanning practiced by the apparatus of FIG. 1, FIG. 6 is a plan view of one possible positioning means for use with the apparatus of the invention, FIG. 7 is a side view of the means shown in FIG. 6, FIG. 8 is a schematic block diagram of the spiral logic portion of the apparatus of FIG. 1, FIG. 9 is a schematic block diagram of the radial logic portion of the apparatus of FIG. 1, FIG. 10 is a schematic block diagram of the comparing means and probability logic portions of the apparatus of FIG. 1, and FIG. 11 is a block diagram of a portion of the means of FIG. 10 showing an alternative thereto.

Briefly, the invention comprises contour pattern identification apparatus for determining whether a questioned pattern of contour lines submitted thereto is known comprising scanning means adapted to scan a questioned pattern of contour lines and produce a train of electrical pulses correlative to the scanning path; memory storage means providing stored indicia correlative to a known pattern of contour lines; reference coordinate determination means adapted to search the questioned pattern of contour lines for a known reference coordinate comprising means for controlling said scanning means so as to direct a predetermined sequence of scans constituting a fixed number of possible orientations of said known reference coordinate on said pattern of contour lines; pattern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

Referring to the drawings, and particularly to FIGS. 1 through 5 thereof, the invention broadly comprises memory storage means 26 wherein are stored indicia at addressed positions, the indicia being records of the pulse trains produced by a scanning means such as means 20 recorded when such means previously scanned for storage a certain contour pattern, for example, in the case of fingerprint contour pattern lines, when part of the anatomy such as finger 24 was scanned in a certain predetermined geometric pattern of scans. Although the figures illustrate the use of the invention with fingerprint contour patterns, it is to be clearly understood, and it will be pointed out where appropriate, that the same principles apply to operation upon other contour patterns. Each addressed position in the memory corresponds to a certain human individual, and included among said indicia at each position is at least one pulse train record representing a known reference coordinate A, shown in FIGS. 3 and 5, which exists on the finger recorded at that specific address position in memory storage means 26.

Misalignment between finger 24 and face 21 of scanning means 20 during attempted recognition of finger 24 is an important prior-art problem solved by the present invention. Even a small misalignment, such as for example, 5° of arc can cause unreliable matching of the finger and its record. Mechanical expedients for removing some of the misalignment are valuable, but experience has shown that fingers vary widely in size and shape, with the consequences that mechanical expedients cannot totally remove misalignment for a wide variety of submitted persons without becoming unduly cumbersome. On the other hand, such expedients can easily align a variety of fingers to within a broad tolerance such as plus or minus 10° of arc. However, when scanning fingerprints alignment to the order of magnitude of plus or minus 1° of arc is generally necessary for broad reliability of results, and of course, with other parts of the anatomy mechanical expedients alone fail almost completely to give even a reasonable first approximation to the order of magnitude of alignment required.

This problem is solved in the invention by employing a scanning means 20 which is directed in the preliminary identification phase by spiral logic 27 and radial logic 28, together constituting the aforesaid reference coordinate determination means which serves to align the finger 24 with the record in memory means 26. While radial scans similar to those in FIG. 2 may be employed in the preliminary or reference coordinate finding phase, and while radial scans similar to those in FIG. 5 may be employed in the final or identification phase, it will be apparent as the description proceeds that other geometric patterns of scans may be employed for both the preliminary and the final phase of the procedure, the radial pattern merely being preferred. Hereinafter these two phases will be termed phase one and phase two, respectively.

Phase one constitutes a series of radial scans shown in FIG. 2 on center $\alpha$. The scans constitute a predetermined number between angular position $\phi$ and angular position $\theta$ relative to axes X and Y of the scanning means 20. The exact angle of each such scan is thus known, and in one practical example the angle between $\phi$ and $\theta$ includes 20° of arc traversed by 21 scans spaced 1° apart. The angle between $\phi$ and $\theta$, and the number of scans therebetween can, of course, be varied depending upon the probable initial misalignment of finger 24 and the desired degree of resolution of that misalignment. As aforesaid, with mechanical means 23 capable of at least plus or minus 10° alignment of finger 24, a 20° arc included between angular positions $\phi$ and $\theta$ is sufficient to include reference coordinate A if it exists on finger 24. Also generally 1° of resolution of alignment is desirable for most reliable identification.

During phase one the pulses produced by scanning means 20 during each individual scan are compared by comparing means 29 with the record of reference coordinate A in memory storage means 26 at the previously called-up addressed position. Call-up may be specific to an individual as by addressing means 30, or may be by a serial review of all positions where feasible. In any event when comparing means 29 receives a pulse train from scanning means 20 that matches the record of reference coordinate A in memory storage means 26, the reference coordinate A has been located on finger 24.

This location may occur during the first series of scans in phase one, that is, the series between angular positions $\phi$ and $\theta$ with center $\alpha$, as shown in FIG. 2. However, if this series produces no match, an advance command will be given to spiral logic 27 by probability logic 31, and spiral logic 27 will shift the center from $\alpha$ to $\beta$ as shown in FIG. 4, and instruct radial logic 28 to repeat the previous series of scans, but on center $\beta$. Such scanning and center-shifting are repeated until either a match with reference coordinate A is found, or all centers are exhausted.

If all centers are exhausted without a match, a last-center-finished signal from spiral logic 27 to probability logic 31 will cause decision means 32 to indicate that finger 24 is unknown, since if reference coordinate A cannot be found, there is no need to proceed further. On the other hand, if reference coordinate A is found, the center and angular position thereof constitute the fixed reference for the identification scans of phase two. Upon identification of reference coordinate A by probability logic 31 applied to the comparison made in comparing means 29, probability logic 31 stops radial logic 28 at coordinate A and directs radial logic 28 to begin a series of phase two radial scans relative to coordinate A. This latter is the select command, since probability logic 31 must select which of the phase one and phase two mode scans are to be made next by radial logic 28. At the same time probability logic 31 directs spiral logic 27 to stop shifting centers and maintain the present center (by not sending an advance signal), and also directs the memory storage means 26 to advance to the record of the first identification scan after reference coordinate A. Collectively these actions constitute passing from phase one to phase two.

Continuing with the broad description of the invention, in phase two a wide series of spaced scans, as for example, in FIG. 5, are taken. Therein is shown a full 360° circle of 10° spaced scans, by way of example. Different spacing and a lesser total arc is optional. The scans in FIG. 5 are of the face 24a of finger 24. Other contour patterns may of course be so scanned, as is pointed out throughout this specification. Scan B in FIG. 5 is compared by comparator 29 with the record for that position on the finger contained in memory means 26. Since reference coordinate A of FIGS. 3 and 5 was precisely located during the aforesaid phase one, each radial scan in phase two shown in FIG. 5 and beginning with scan B is in actuality scanning exactly the area corresponding to the record in memory means 26 for that radius counting from radius A. After each scan, radial logic 28 directs scanning means 20 to run another radial scan at the next directed angle, and probability logic 31 advances the record in memory storage means 26 to that of the next scan position recorded therein. Since the object of phase two is identification, enough scans such as B, C, D, etc., are made to determine whether or not a predetermined probability of identity is met. The apparatus may thus identify finger 24 before all the scans are made, or it may run through all the scans. Because scan A is exactly determined, misalignment is defeated, and logic 31 can erect a very high probability that finger 24 is indeed the same as that stored in memory means 26, because no probability concession need be made to the effect of misalignment. Logic 31 can then render a decision by means 32 which may be a relay, an indicator, or any other suitable expedient.

It will be understood that when a contour map is presented to means 23 instead of a finger, indexing of the map may easily be inherently made, as for example by known margins or known internal lines, however, finding reference coordinate A can be just as real a problem in many attempts to identify a general contour map as with a live finger as just described. In all situations where the contour map or the like has not been pre-indexed, or cannot be pre-indexed, the said reference coordinate may be found in phase one as aforesaid, and will have all the advantages already recited for fingerprint contour pattern identification.

Describing the invention now with greater detail and particularity, the aforesaid portion of the human anatomy, for example finger 24, is roughly positioned in positioning means 23, shown highly schematically in FIG. 1, and with greater particularity in FIGS. 6 and 7. As aforesaid, mechanical alignment means are not entirely necessary with the present invention, but are advantageous. Thus, if a very wide angle is scanned between positions $\phi$ and $\theta$ in phase one, very little alignment is required. In the extreme, no alignment is required if the aforesaid sweep in phase one is a full 360°. However, for reasons of speed and economy, some rough prealignment is desirable to reduce the necessary phase one sweep to the 20° example discussed above.

A variety of mechanical expedients are possible that will provide the aforesaid rough alignment. Shown in FIGS. 6 and 7 is one useful embodiment of such a means. The base 23a of positioning means 23 has fixedly mounted thereon a finger tip stop 23b adapted to abut the inserted finger 24 extremity. Spaced on either side of stop 23b are removable side stops 23c and 23d which have respective base portions 23e and 23f. These latter portions are slidably detained on base 23a by means of a plurality of pin and groove joints 23g. A spring 23h urges side stops 23c and 23d toward abutment with fixed finger tip stop 23b. A pair of springs 23i urge side stops 23c, 23d respectively toward one another. As is best shown in FIG. 7, a prism 23j has one face 23k thereof forming the portion of base 23a bounded approximately by stops 23b, 23c, 23d. A light source 23m is directed against a second face of prism 23j, and an image may be taken off a third face thereof.

The arrangement of the parts in this example expedient is such that a range of finger sizes and proportions may be accommodated, and in each case the approximate center thereof will lie near the center of the aperture formed by stops 23b, 23c, 23d, by virtue of the fact that the various springs are adjusted to allow equal motion to side stops 23c, 23d upon insertion of a finger therebetween. This fact aids the finding of coordinate A because if all fingers have their center at approximately the same spot near the center of the aperture, shifting of centers α, β, γ, etc., in phase one will be minimized. The prism 23j helps define a clear print image with the aid of light source 23m. However, it will be understood that other means may be employed as aforesaid, the present means being merely by way of illustration.

On the optical axis 22 and between positioning means 23 and face 21 of scanning means 20 may be placed an appropriate optical system 25 shown highly schematically in FIG. 1. In the preferred form, scanning means 20 comprises a vidicon tube with supporting energization circuits. However, other devices capable of transforming an image into a train of pulses proportional to the intensity of the image along any line therein, may be employed. For example, a matrix of photosensitive cells can perform this function, as can several other means known to the art. No limitation on the nature of the scanning means 20 is to be inferred. Since in general the human epidermis texture will not produce a perfectly regular geometric train of pulses with a vidicon or other scanning means 20, a pulse shaper 33 accepts the output of each scan which will be in fairly regular form, and shapes them to more regular and uniform pulses of the same spacing and periods.

When a record of finger 24 or any other contour pattern is to be made at an addressed position in memory storage means 26, the output of pulse shaper 33, or if no pulse shaper is required by the nature of the contour pattern under scrutiny, then alternatively the output of scanner 20 itself will be switched by selector 35 to isolation amplifier 34, which may be a standard isolation amplifier well known to the art. Such switching will put the apparatus in the read-in phase, and the train of pulses from scanning means 20 will be shaped by pulse shaper 33, when a pulse shaper is employed, and read-in by memory storage means 26 via isolation amplifier 34. It should be understood that the record in memory storage means 26 may have originated at some other location and may have been transmitted to means 26 electronically, or by physical transportation. While it is convenient and somewhat advantageous to use the same equipment train from positioning means 23, to optical system 25, to scanning means 20, and to pulse shaper 33 in both the read-in and read-out operations, it is by no means necessary. Similar equipment designed to produce a record of finger 24 that will match the scan of finger 24 will suffice in the record making stage, and as aforesaid, the record may be transmitted to memory means 26 electronically or transported there physically Preferably memory storage means 26 will constitute a magnetic tape memory having high speed access to address positions, such as for example, Model 727 or 729 magnetic tape unit manufactured by the International Business Machines Corporation. Of course, many other such storage means may also be employed. For example, magnetic discs, drums, or cards can also be employed, as well as photographically recorded indicia on film or glass, etc., or electrostatically recorded indicia on similar media. Hereinafter when tape is referred to, it will be understood that these and other alternative indicia-recording media may be substituted therefor.

When selector 35 is appropriately switched, the output of pulse shaper 33, or, where appropriate, the output of scanner 20, is fed to comparing means 29, and the memory storage means 26 enters a read-out process. It is preferred to address the memory of means 26 by employing addressing means 30, which advantageously may comprise an appropriately punched card or other means. Such a card may even be, for example, the wallet identification card of an employee at his place of employment, in the case of use as a fingerprint contour identification apparatus. Alternatively, the submitting individual might state his identity to the guard who would address the memory means 26 by a card on a rack in his possession, or by other manual means, and then the fingerprint identification could proceed.

In general then, addressing means 30 may be any appropriate means for calling up the fingerprint submitting person's record at his address position in memory means 26. An equal range of addressing possibilities exist when other contour patterns are to be scrutinized.

One highly advantageous procedure in the example of plant employee check-in at a gate, is the possibility of releasing the employee's time-card from a rack only when his fingerprint has been identified, as known in general, or alternatively, as known to be his. Only the identified individual's card would be released, thus preventing fraud at the time-clock. Decision means 32 would there constitute a bank of locks, one for each time-card, and only the appropriate card would be released to the employee. Another possibility is to allow the employee to extract his card from a rack and employ it to call up his record in memory means 26 while his finger is being scanned for correspondence. These possibilities do not relate directly to the invention itself, but are mentioned merely to point out a few of the many new possibilities that flow therefrom.

It is also possible, when the submitting individual's record does not appear in memory means 26, that is to say when decision unit 32 decides he is not known to be the person he claims, to search the entire record in memory means 26 to determine if he is known at all. Also a larger universe outside memory means 26 can be resorted to, for example, the entire company personnel instead of merely those allowed into a classified area. Clearly this can be adapted to the present apparatus by having a larger and a smaller universe on the tape of means 26, or by providing optional access to a centralized larger tape stand-by unit. Many other possibilities of use will occur to those skilled in the art.

These various options apply as well to scrutinization of contour patterns in general. For example, a large contour map can be scrutinized portion by portion either against addressed records, or against a serial review, until identified, or at least identified as known in part, or not known.

The operational interrelation of comparing means 29, probability logic 31, radial logic 28, spiral logic 27, and memory storage means 26 will now be described. These interrelations are best understood in view of the technique in scanning and deciding what the scans mean. In this technique, as may best be understood by resort to FIGS. 3, 4, and 5, a series of scans as in FIG. 3 at center α is made in phase one. As aforesaid, if coordinate A is not found therein, a new center β is tried with another series of scans and so on. But assuming that the proper center, labelled 8 for generality in FIG. 3, has been arrived at, a first technique for identifying coordinate A during the series of scans from that center would constitute demanding a match between some single scan and the record for coordinate A. Thus in this technique, as shown by FIG. 3 wherein only five scans are shown for simplicity, the two scans shown prior to scan A, that is those labelled A–2 and A–1, would not match the record for A, nor would the two scans after A, that is those labelled A+1 and A+2. In such an arrangement, straight matching between each scan and the record is all that is required. A variation consists of counting matched pulses in a series of scans, and deciding where coordinate A is by a fixed logical rule or by matched pulse density or the like. Thus in either variation of the technique, comparing means 29 could constitute a pulse comparator hereinbelow described in greater particularity, and probability logic 31 could constitute read-out means on the comparator voltage difference, with probability bias applied so as to erect a certain probability, that is, so as to require a certain degree of matching. In the phase two or identification phase of operation, the latter variation, i.e., serial counting of matched pulses throughout all scans, is highly advantageous. These techniques will be more fully explained hereinbelow, the present discussion serving primarily to prepare an understanding of the specific circuitry involved.

In any of the aforesaid variations or combinations thereof, when coordinate A is finally identified spiral logic 27 is stopped, radial logic 28 is directed to start the generally greater spaced scans B, C, D, etc., of phase two, and storage means 26 is directed to advance successively to each record position corresponding to each such phase two scan. Thus in FIG. 4 the angle $\psi$ and the general center $o$, which may be any of $\alpha$, $\beta$, $\gamma$, etc., defines the located coordinate A. In FIG. 5, wherein an example 360° sweep of 10° scans for phase two is shown, the angle $\psi$ and coordinate A appear. Directed by probability logic 31 to start a phase two series of scans, radial logic 28 will sweep out radius B 10° from known coordinate A while memory storage means 26 has been directed to advance to the record corresponding to the true radius B. The pulses from scanning means 20 are compared to the record for radius B, and the same is done successively for C, D, etc. This comparison is made, as already mentioned, in a similar fashion to that made in phase one operation. This will be more fully explained hereinafter.

The particular means 27, 28, 29, and 31 shown in FIGURE 1 will now be described. Spiral logic 27 is shown in FIGURE 8. A gate 27*a* is included in the input of up-counter 27*b*. Clock pulses are fed to gate 27*a* from source 27*c*, which may be any appropriate means for producing precisely timed pulses. Up-counter 27*b* feeds its count to down-counter 27*d* via gate 27*e*. An advance signal is accepted from probability logic 31 of FIGURES 1 and 10, by gate 27*a* and down-counter 27*d*. An advance signal at gate 27*a* allows one pulse from source 27*c* to pass through gate 27*a* and to up-counter 27*b*. Down-counting in 27*d* is controlled by the advance signals so that each time a signal appears at down-counter 27*d*, one count down is made, until a zero count, after which there is no effect. The count in up-counter 27*b* is compared to the setting in count setter 27*f* by subtraction comparator 27*g*, and when the count in 27*b* exceeds that set into 27*f* by one (or any other chosen amount) that fact constitutes a last-center-finished signal to probability logic 31, as shown in FIGURES 1 and 10.

The condition of down-counter 27*d* controls the state of XY flip-flop 27*h*, and the state of gate 27*e*. When down-counter 27*d* goes from a count of one to a count of zero (and only then), 27*d* opens gate 27*e* so that the count in counter 27*b* (if any) is passed to counter 27*d*, and 27*d* changes the state of XY flip-flop 27*h* from its present setting (e.g., X or Y) to the other setting (e.g., Y or X). The XY flip-flop 27*h* controls the + − flip-flop 27*i*, the gate 27*a*, and the gates 27*j* and 27*k*. The latter two gates, 27*j* and 27*k*, guard the path from the output of down-counter 27*d* to up-down counters 27*x* and 27*m* respectively. When XY flip-flop 27*h* changes from X to Y state (and only then), + − flip-flop 27*i* is changed from its present setting (e.g., + or −) to the other setting (i.e., − or +). Also the X to Y change opens gate 27*a* to accept the next advance signal from probability logic 31, at which time, one pulse is accepted from 27*c*, and then gate 27*a* closes again. The X to Y change opens gate 27*k* and closes gate 27*j* (one gate is always open, and one always closed). The change from Y to X opens gate 27*j* and closes gate 27*k*.

The polarity condition of + − flip-flop 27*i* is fed to both of up-down counters 27*x* and 27*m*, and also is fed to radial logic 28, shown in FIGURE 9, as a polarity reference voltage. The count on either of up-down counters 27*x*, 27*m*, is read-into digital registers 27*n*, 27*p*, respectively. The count registered in registers 27*n*, 27*p*, is converted to a plus or minus voltage of corresponding value by digital-to-analog converters 27*q*, 27*r*, respectively. These digital-to-analog converters may be of any kind known to the art, suitable for the purpose described. Each of converters 27*q*, 27*r*, is referenced to a precision reference voltage source 27*s*, which may be, for example, the output of a chopper stabilized amplifier referenced to the output of a Zener diode in a temperature controlled oven. Converter 27*q* is fed a cosine function and converter 27*r* is fed a sine function, from saw-tooth generators 27*t*, 27*u*, respectively. The output of converters 27*q*, 27*r*, is fed, respectively, to the horizontal plates 20*a* and the vertical plates 20*b*, of scanning means 20, via amplifiers 27*v*, 27*w*.

The operation of spiral logic 27 is best understood by tracing through a sequence of events. When a new individual or pattern is submitted to the apparatus, each of counters 27*b*, 27*d*, 27*x*, and 27*m*, is reset to zero. This can be done manually, as by a starting button, or automatically, as by utilizing the same initiating event utilized by addressing means 30 in FIGURE 1. Since counters 27*x* and 27*m* are now set to zero, the voltages at plates 20*a*, 20*b*, are set to zero, and the scanning means 20 rests its beam at the initial or $\alpha$ center shown in FIGURE 5. Since counter 27*d* has been set to zero, and thus through one to zero, the gate 27*e* is at that point opened. Also the apparatus is arranged so that the flip-flops are reset, the Y state being attained in XY flip-flop 27*h*, and the + state in + − flip-flop 27*i*.

This center $\alpha$ (or any subsequent center) is maintained during the entire sequence of scans undertaken by radial logic 28 at that center. During the series of scans, reference coordinate A may or may not be found. Only if it is not found is further operation of spiral logic 27 required. An advance signal generated by probability logic 31 when the sequence of scans at center $\alpha$ is complete is fed to gate 27*a* (which was previously opened) and thence a pulse is fed to up-counter 27*b* which then goes from zero to one. The advance signal has no effect on down-counter 27*d*, to which it also was fed, since gate 27*a* was open and zero was on down-counter 27*d*. Also since gate 27*e* was open, the one reading in up-counter 27*b* is transferred to down-counter 27*d*. The setting of down-counter 27*d* from zero to one produces an output level through initially open gate 27*k* to up-down counter 27*m*, which is caused to count up one because of the initial + condition in + − flip-flop 27*i*. This output from down-counter 27*d* to gates 27*k*, 27*j*, also constitutes a repeat signal to radial logic 28 (through a delay circuit if desired). The up-one registered in 27*m* gives it a reading of plus one since it was initially reset to zero, and this results, via means 27*p*, 27*r*, 27*w*, and 20*b*, in a step of plus one in the Y or vertical direction, as shown in the step from $\alpha$ to $\beta$ in FIGURE 5. Normally there is no problem taking the radial logic repeat signal off before the counters 27*x*, 27*m* have accepted the same signal. In other words, the new radial sweeps will not be made before the new center is attained. However, as mentioned above, suitable delay means may be employed with any equipment that might otherwise tend to make new radial sweeps before the center shift is complete.

If the complete sequence of scans at center $\beta$ also fails to find reference coordinate A, then again probability logic 31 sends an advance pulse to spiral logic 27 which is received by gate 27*a* and down-counter 27*d*. This time gate 27*a* is closed (because down-counter 27*d* did not go from one to zero after the last advance pulse passed through gate 27*a*) and down-counter 27*d* has a count in it. The count is one, and thus the advance signal drives down-counter 27*d* from one to zero. This latter changes XY flip-flop 27*h* from Y to X, thus opening gate 27*j* and closing gate 27*k*. The one to zero count change in down-counter 27*d* also opens gate 27*e*, and the one count remaining in up-counter 27*b* from the last center is transferred to down-counter 27*d*, from where it is fed to up-down counter 27*x* via now-open gate 27*j*. The one count is plus in sign, since + − flip-flop 27*i* has not changed from its initial + setting (there having been no XY change at all, in XY flip-flop 27h in the $\alpha$ to $\beta$ changeover sequence; and only a Y to X change therein in the present $\beta$ to $\gamma$ changeover sequence). The plus one count is registered in digital register 27n, giving it now a total count of plus one, and the corresponding voltage is produced by digital-to-analog converter 27q and fed via amplifier 27v to horizontal plates 20a of scanning means 20. Since the plus one count is still in digital register 27p, the Y or vertical coordinate is unchanged, and the plus one step in the X or horizontal coordinate produces the $\beta$ to $\gamma$ changeover shown in FIGURE 5.

The entire rules of spiral logic 27 will now be entirely understood by those skilled in the art. The same changeover sequence is repeated for each of the centers shown in FIGURE 5, by a sequence analogous to the two just detailed. It is not necessary to outline each step of each subsequent center changeover, since the rules are now clear, but a table is presented hereinbelow showing the sequence of the critical logic elements for each of several center changeovers, including the two already fully described in detail. Still further centers can be added simply by operating the circuitry further, while providing appropriate upper-limit counters and the like. To avoid confusion, the centers in FIGURE 5 and the Table I below are identified by alpha, beta, gamma, and delta (or their symbols) followed in order, by their primes, their double primes, etc. This avoids confusing the centers with the angles already discussed, and designated by similar Greek letters. In the table, $D_x$ means the horizontal or X coordinate of the center, and $D_y$ means the vertical or Y coordinate of the center, both with reference to *o, o* being the origin (center $\alpha$).

$S_1$, $S_2$, $S_3$ . . . $S_n$, respectively, which switches are preferably solid state devices for speed of operation.

The values of the various resistors are arranged, as will be apparent to those skilled in the art, so that various combinations of switching of the mentioned switches may produce a sine function amplification by amplifier 28d. Similarly, amplifier 28e has the same array, for the purpose of producing the corresponding cosine function amplification in amplifier 28e. When properly switched, the arrays can cause the sweep in progress to follow any desired angle relative to the X and Y coordinates, as shown in FIGURES 3 and 4. A sequencing control 28f controls the said switching, and thus the sequence, number, and angular orientation, of sweeps in a given series. Means 28f may be any electromechanical or electronic programming device for closing the said switches in a definite order.

The sequencing control 28f is arranged so that on start-up of the overall apparatus, a phase one (small angular steps) series of scans is begun. Either this series runs its programmed length, or it is stopped by the stop signal from probability logic 31 fed to sequencing control 28f. This latter event indicates (during any phase one series of sweeps) that coordinate A has been found, and stopping the sweep there is appropriate because the first phase two sweep will be at that precise angle.

If however the first sequence of phase one sweeps (that is, on center $\alpha$, after start-up) runs its course, probability logic 31, which has not identified reference coordinate A during that preordained number of sweeps, will recognize that fact (as hereinbelow further explained) and will direct spiral logic 27 to advance to center $\beta$, and spiral

TABLE I

| Fig. 5 Center Designation | Center Shift To Get There | $D_x$ | $D_y$ | Open Gate | Polarity of 27i, or polarity of 27x, 27m | 27b count | 27d count |
|---|---|---|---|---|---|---|---|
| Alpha | (Initial reset) | 0 | 0 | 27j | + | 0 | 0 |
| Beta | Alpha to beta | 0 | +1 | 27k | + | 1 | 1 |
| Gamma | Beta to gamma | +1 | +1 | 27j | + | 1 | 1 |
| Delta | Gamma to delta | +1 | 0 | 27k | − | 2 | 2 |
| Alpha′ | Delta to alpha′ | +1 | −1 | 27k | − | 2 | 1 |
| Beta′ | Alpha′ to beta′ | 0 | −1 | 27j | − | 2 | 2 |
| Gamma′ | Beta′ to gamma′ | −1 | −1 | 27j | − | 2 | 1 |
| Delta′ | Gamma′ to delta′ | −1 | 0 | 27k | + | 3 | 3 |
| Alpha″ | Delta′ to alpha″ | −1 | +1 | 27k | + | 3 | 2 |
| Beta″ | Alpha″ to beta″ | −1 | +2 | 27k | + | 3 | 1 |
| Gamma″ | Beta″ to gamma″ | 0 | +2 | 27j | + | 3 | 3 |
| Delta″ | Gamma″ to delta″ | +1 | +2 | 27j | + | 3 | 2 |
| Alpha‴ | Delta″ to alpha‴ | +2 | +2 | 27j | + | 3 | 1 |
| Beta‴ | Alpha‴ to beta‴ | +2 | +1 | 27k | − | 4 | 4 |
| Gamma‴ | Beta‴ to gamma‴ | +2 | +0 | 27k | − | 4 | 3 |
| Delta‴ | Gamma‴ to delta‴ | +2 | −1 | 27k | − | 4 | 2 |
| Alpha⁗ | Delta‴ to alpha⁗ | +2 | −2 | 27k | − | 4 | 1 |
| Beta⁗ | Alpha⁗ to beta⁗ | +1 | −2 | 27j | − | 4 | 4 |

Radial logic 28 is shown in FIGURE 1, and in detail in FIGURE 9. A saw-tooth generator 28a produces the appropriate waveform, as illustrated, for generating radial sweeps. The general principles of such generation are well known, and may be found, for example, in Chapter IV of Principles of Radar, third edition by Reintjes and Coate, McGraw-Hill, 1952, New York. The saw-tooth signal is fed to each of digital-to-analog converters 28b and 28c, representing respectively the horizontal or X and the vertical or Y coordinates of the moving sweep. Reference voltages from spiral logic 27 are also introduced to converters 28b, 28c. The output voltages of 28b and 28c are amplified by amplifiers 28d and 28e respectively.

In general, the said amplifiers will be arranged so as to have precisely variable gains for determining the precise angle of sweep between them. In the example illustrated form, they are variable in gain by means of a plurality of parallel resistors that are mutually in parallel with the amplifier, and are individually switchable into and out of parallel therewith. Specifically, amplifier 28d is in series with a resistor R and in parallel with another resistor R′ and a plurality of paralleled resistors $R_1$, $R_2$, $R_3$ . . . $R_n$, each of which latter resistors is in circuit with a switch logic 27 will when center $\beta$ is attained, direct radial logic 28 (via sequencing control 28f) to repeat the same sequence of radial sweeps, that is, the same number and spacing as preordained for all phase one sequences. This process is repeated until either reference coordinate A is identified, resulting in a stop signal to sequencing control 28f from probability logic 31, or until a last-center-finished signal is sent from spiral logic 27 to probability logic 31, which may shut the whole apparatus down and indicate a failure to identify at means 32.

When (at whatever center) reference coordinate A is found, and a stop signal issues from probability logic 31 to sequencing control 28f stopping the sweep at that precise angle, a select signal from probability logic 31 to sequencing control 28f brings into play the latter phase two program of switching, that is, the program for a preordained number of wider spaced scans starting from the then-present angle of reference coordinate A. The duty of radial logic 28 during phase two scanning is simply to continue its program until it ends or a stop signal issues again from probability logic 31.

Comparing means 29 and probability logic 31 are shown in FIGURES 1 and 10. AND gate 29 constitutes an example of comparing means 29, and a pulse and sweep counting system constitutes an example of probability logic 31. Other means will be apparent to those skilled in the art, as their operation is described.

Consider first a single pulse train from each of scanning means 20 and memory storage means 26. Those trains represent one sweep of scanner 20, and a comparison record therefor in means 26. In FIGURE 10 the train is simplified to show only three pulses, in reality, of course, many more will occur. AND gate 29 matches only pulses $1_T$ and $3_T$ of the memory storage means 26 with $1_S$ and $3_S$ of the scanner 20. Pulse $2_T$ has no corresponding timed pulse on the scanning train and pulse $2_S$ has none on the record train. Consequently, AND gate 29 transmits two pulses as shown to pulse counter 31*a*.

Sweep counter 31*d* functions to count each sweep by means of a signal from saw-tooth generator 28*a* upon completion of the sweep. Sweep counter 31*d* thus counts each train of pulses, rather than each individual pulse. In phase one, a given number of sweeps is made at each sweep center. In phase two, a given number of sweeps is made from coordinate A, that is, from the correct center and radial found in phase one as a starting point for phase two. Consequently in phase one an advance signal is sent to AND gate 31*f* by sweep counter 31*d* after each predetermined number of sweeps at that center. If no sweep in that series has been identified as coordinate A, as hereinafter described, another advance signal is sent to AND gate 31*f* by subtract circuit 31*c*, and the combination results in an advance signal from gate 31*f* to spiral logic 27. Also in phase one a reset signal is sent to pulse counter 31*a* by sequence counter 31*d*, after each sweep is completed. When phase two has been entered, sweep counter 31*d* sends an advance signal to memory storage means 26 after each train of pulses is finished.

Pulse counter 31*a* counts the individual matched pulses fed to it by AND gate 29. Probability level setter 31*b* is adjusted to demand a certain number of matches. This number can be different in phase one and phase two, as hereinafter described. Subtract circuit 31*c* subtracts the demand number of probability level setter 31*b* from the count number in pulse counter 31*a*, and produces a voltage that either does or does not meet a certain level. In phase one, a voltage not meeting that pre-set level constitutes the advance signal to AND gate 31*f*, which, when added to the advance signal from sequence counter 31*d*, produces an advance signal to spiral logic 27. This guarantees that the entire sequence of scans on that center is both finished and unsuccessful, before advance to a new center. Also in phase one, a voltage meeting or exceeding that pre-set level constitutes the stop signal sent to radial logic 28, which stop signal fixes coordinate A at the current angular sweep orientation. Since the aforesaid pre-set level has been met or exceeded, no further advance of spiral logic 27 is possible, so this stop signal acts also to fix coordinate A at the current center in spiral logic 27. Also in phase one, the absence of a stop signal (i.e., in effect, an advance signal) is fed to AND gate 31*g*. If a last center finished signal is also sent to AND gate 31*g*, the decision means 32 is made to show that the object is not identified, since reference coordinate A has not been found, and identification has failed before phase two even begins. This shuts down the whole process, of course.

Phase two is entered when reference coordinate A is found. Consequently the stop signal to radial logic 28 also constitutes the select signal thereto. That is, when radial logic 28 is stopped by subtract circuit 31*c*, it also shifts into a phase two sequence of radial scans in angular spacing. As aforesaid, spiral logic 27 is stopped when entering phase two by the absence of an advance signal thereto from gate 31*f*, which absence has to occur when the stop signal just mentioned is present at AND gate 31*f* (as opposed to the advance signal). The said stop signal also causes sweep counter 31*d* to henceforth count single scans, and send an advance signal to memory storage means 26, as aforesaid, before each new phase two scan, including the first said scan.

In phase two, no advance signal is sent to spiral logic 27 as already explained. At the then present center, therefore, the FIGURE 5 sequence of radial sweeps is made. Thus sweep counter 31*d* advances the record in memory storage means 26 to that for radial B, and that radial is scanned by sequencing control 28*f* of radial logic 28 (in response to the initial select signal thereto, as aforesaid). The pulse trains from means 26 and means 20 are compared by AND gate 29, as was also done in phase one, and the matched count is fed to pulse counter 31*a*, from whence it goes to subtract circuit 31*c*, which determines whether or not the probability level of setter 31*b* has been met, as aforesaid.

For simplicity in describing phase one, a reset signal was mentioned from sweep counter 31*d* to pulse counter 31*a* that reset the latter after each pulse train. That mode of operation implements a phase one operation wherein each radial is separately compared to the record of reference coordinate A. That mode is preferred for phase one, although another, serial mode can be practiced there too. But in phase two the serial mode is preferred and will now be explained. No reset signal goes to pulse counter 31*a* (except initial reset) after each scan, during phase two. Rather it is preferred to set probability level setter 31R*b* to a certain level, and to count matched pulses of each scan in toto against that probability setting. In this mode therefore, a phase two signal representing the subtraction of the total count of pulse counter 31*a* minus the setting in setter 31*b*, is fed directly to decision means 32, which may be a relay, for example.

In that mode, when the difference between the two counts (that is, count of 31*a* minus count of 31*b*) reaches a predetermined level (e.g., predetermined by the setting of the relay mentioned as an example of means 32) the means 32 will indicate that the object being scanned has been matched to the predetermined probability to the record under scrutiny in memory storage means 26. However, it is also possible in phase two, as is shown in FIGURE 11, to reset the pulse counter 31*a* after each sweep has been counted by sequence counter 31*d*, and to register the result of that scan individually in register 31*e*. Thus, a plurality of scans produces a plurality of results in register 31*e*. It is then a voltage representing the number of scans that individually met the probability of means 31*b* that is sent by register 31*e* to decision means 32, not one representing the total number of pulses that matched (regardless of what scans they occurred in) as under the first mentioned mode. Clearly also this mode could be employed in phase one, by registering more than one scan meeting a lower likelihood of being reference coordinate A, and then picking the best likelihood among such scans, as has already been mentioned. Other possibilities of operation will be apparent to those skilled in the art.

It should be understood that while phase one has been illustrated as a process for matching trial radial scans from a square spiral succession of centers against the record for reference coordinate A, variations thereon are within the the scope of the invention. For example, instead of a square spiral of successive centers, another pattern designed to logically traverse the intended area could be employed, such as any other form of spiral of centers, or a matrix of centers followed in an established sequence, or any other pattern of centers. In any event, when a life-size fingerprint is scanned, its face area (24*a* in FIG. 5) is on the order of one square inch, and it has been found that spacing between the trial centers $\alpha$, $\beta$, etc., of the order of magnitude of 0.005" is very satisfactory. This would involve about 1250 such centers to cover a trial area about ⅛" by ¼". When twenty trial radials are tried at all 1250 centers, using a vidicon for scanning means 20, the 30 microsecond radial sweeps would thus total about 0.8 seconds for the extreme upper limit for phase one scanning. When patterns other than fingerprints are to be scanned, they can be reduced to these dimensions optically or photographically, or the equipment can be scaled up. Of course all this quantitative data is by way of example only, and will be adjusted in practice to give the desired results.

Furthermore, in phase two, with reference coordinate A identified, the subsequent sequence of scans need not be radial, but may be any pattern of scans using coordinate A as a fixed reference and designed to traverse a sufficient portion of the subject pattern to effect identification. The phase two scan can thus be, in addition to radial scans, a pattern such as raster scanning, or any other pattern of scanning paths covering the area (provided of course, that the memory record covers the same paths). The square spiral of centers in phase one and the series of radial scans in phase two are thus the preferred but not the exclusive patterns employable with the invention. Now that the principles of the invention have been pointed out, the appropriate variations in the illustrated apparatus needed to effect these other patterns will be recognized by those skilled in the art.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing stored indicia correlative to a known pattern of controur lines; reference coordinate determination means adapted to search the questioned pattern of contour lines for a known reference coordinate comprising means for controlling said scanning means so as to direct a predetermined sequence of scanning centers, and means for controlling said scanning means so as to direct a predetermined sequence of scans from each said scanning center; pattern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

2. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing stored indicia correlative to a known pattern of contour lines; reference coordinate determination means adapted to search the questioned pattern of contour lines for a known reference coordinate comprising means for controlling said scanning means so as to direct a predetermined sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

3. Contour pattern identification apparatus for determining whether a questioned pattern of controur lines submitted thereto is known comprising scanning means adapted to scan said questioned pattern of contour lines and produce a train of electrical pulses correlative to the scanning path; memory storage means providing stored indicia correlative to a known pattern of contour lines; reference coordinate determination means adapted to search the questioned pattern of contour lines for a known reference coordinate comprising means for controlling said scanning means so as to direct a predetermined spiral sequence of scanning centers, and means for controlling said scanning means so as to direct a predetermined sequence of radial scans at each said scanning center; pattern identification means adapted to respond to location of reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correpondence.

4. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing storage indicia correlative to a known pattern of contour lines; reference coordinate determination means adapted to search the questioned pattern of contour lines for a known reference coordinate comprising means for controlling said scanning means so as to direct a predetermined outward spiral sequence of scanning centers, and means for controlling said scanning means so as to direct a predetermined sequence of radial scans at each said scanning center; pattern identification means adapted to respond to location of a reference coordinating by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

5. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing stored indicia correlative to the train of electrical pulses produced by said scanning means along certain scan paths on a known pattern of contour lines; reference coordinate determination means adapted to search the questioned pattern of contour lines for a known reference coordinate comprising means for controlling said scanning means so as to direct a predetermined sequence of scanning centers, and means for controlling said scanning means so as to direct a predetermined sequence of radial scans at each said scanning center; patern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

6. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing stored indicia correlative to the train of electrical pulses produced by said scanning means along certain scan paths on a known pattern of contour lines including the scan path of a reference coordinate; reference coordinate determination means adapted to search the questioned pattern of contour lines for said reference coordinate comprising means for controlling said scanning means so as to direct a predetermined sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

7. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing first stored indicia correlative to the train of electrical pulses produced by said scanning means along a reference coordinate on a known pattern of contour lines and providing second stored indicia correlative to the train of electrical pulses produced by said scanning means along paths on said known pattern of contour lines having a known spatial relation relative to said reference coordinate; reference coordinate determination means adapted to search the questioned pattern of contour lines for said reference coordinate comprising means for controlling said scanning means so as to direct a predetermined sequence of scanning centers, and means for controlling said scanning means so as to direct a predetermined sequence of rarial scans at each said scanning center; pattern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

8. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing first stored indicia correlative to the train of electrical pulses produced by said scanning means along a reference coordinate on a known pattern of contour lines and providing second stored indicia correlative to the train of electrical pulses produced by said scanning means along paths on said known pattern of contour lines having a known spatial relation relative to said reference coordinate; reference coordinate determination means adapted to search the questioned pattern of contour lines for said reference coordinate comprising means for controlling said scanning means so as to direct a predetermined outward spiral sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

9. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing first stored indicia correlative to the train of electrical pulses produced by said scanning means along a reference coordinate on a known pattern of contour lines and providing second stored indicia correlative to the train of electrical pulses produced by said scanning means along paths on said known pattern of contour lines having a known spatial relation relative to said reference coordinate; reference coordinate determination means adapted to search the questioned pattern of contour lines for said reference coordinate comprising means for controlling said scanning means so as to direct a predetermined outward spiral sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of scans having a known spatial relation to said reference coordinate; and comparator means adapted to compare the trains of pulses produced by said scanning means with the indicia stored in said memory storage means, first comparing the trains of pulses to said first indicia for reference coordinate correspondence, and then upon reference coordinate correspondence comparing the subsequent trains of pulses to said second indicia for determination of whether the questioned pattern matches the known pattern.

10. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing first stored indicia correlative to the train of electrical pulses produced by said scanning means along a reference coordinate on a known pattern of contour lines and providing second stored indicia correlative to the train of electrical pulses produced by said scanning means along paths on said known pattern of contour lines having a known spatial relation relative to said reference coordinate; reference coordinate determination means adapted to search the questioned pattern of contour lines for said reference coordinate comprising means for controlling said scanning means so as to direct a predetermined sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of radial scans from the same center as the reference coordinate and having a predetermined angular spacing therefrom; and comparator means adapted to compare any train of pulses produced by said scanning means with the indicia stored in said memory storage means for correspondence.

11. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means adapted to provide a plurality of address positions wherein at each said address position indicia are stored correlative to a separate known pattern of contour lines corresponding to that address position; means for providing addressed access to said memory storage means; reference coordinate determination means adapted to search the questioned pattern of contour lines for a reference coordinate comprising means for controlling said scanning means so as to direct a predetermined sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the addressed indicia stored in said memory storage means for correspondence.

12. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means adapted to provide a plurality of address positions wherein at each address position indicia are stored correlative to a separate known pattern of contour lines corresponding to that address position, each said address position including reference coordinate indicia; means for providing addressed access to said memory storage means; reference coordinate determination means adapted to search the questioned pattern of contour lines for a reference coordinate comprising means for controlling said scanning means so as to direct a predetermined sequence of scanning centers, and means for controlling said scanning means so as to direct a predetermined sequence of radial scans at each said scanning center; pattern identification means adapted to respond to location of a reference coordinate by said reference coordinate determinaton means by controlling said scanning means so as to make a series of scans having a known spatial relation to said reference coordinate; and comparator means adapted to compare any train of pulses produced by said scanning means with the indicia stored in said memory storage means for correspondence.

13. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having first stored indicia correlative to the train of electrical pulses produced by said scanning means along a reference coordinate on the associated pattern of contour lines and providing second stored indicia correlative to the train of electrical pulses produced by said scanning means along paths on said associated pattern of contour lines having a known spatial relation relative to said reference coordinate; means for providing addressed access to said memory storage means; reference coordinate determination means adapted to search the questioned pattern of contour lines for said reference coordinate comprising means for controlling said scanning means so as to direct a predetermined sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of scans having a known spatial relation to said reference coordinate; and comparator means adapted to compare any train of pulses produced by said scanning means with the indicia stored in said memory storage means for correspondence.

14. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having first stored indicia correlative to the train of electrical pulses produced by said scanning means along a known reference coordinate on the associated pattern of contour lines and providing second stored indicia correlative to the train of electrical pulses produced by said scanning means along further paths on said associated pattern of contour lines having a known spatial relation relative to said reference coordinate; memory retrieval means adapted to consult each said memory storage means address position and prdouce a train of electrical pulses corresponding to said indicia stored therein; means controlling said memory retrieval means for providing addressed access to said memory storage means; reference coordinate determination means adapted to search the questioned pattern of contour lines for said known reference coordinate comprising means for controlling said scanning means so as to direct a predetermined sequence of scans constituting a fixed number of possible orientations of said known reference coordinate on said pattern of contour lines; pattern identification means adapted to respond to location of a reference coordinate by said reference coordinate determination means by controlling said scanning means so as to make a series of scans having a known spatial relation to said reference coordinate; and comparator means adapted to compare for correspondence any train of pulses produced by said scanning means with the train of pulses produced by said memory retrieval means when consulting the indicia stored in said memory storage means purportedly representing the same scanning path.

15. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having first stored indicia correlative to the train of electrical pulses produced by said scanning means along a known reference coordinate on the associated pattern of contour lines and providing second stored indicia correlative to the train of electrical pulses produced by said scanning means along further paths on said associated pattern of contour lines having a known spatial relation relative to said reference coordinate; memory retrieval means adapted to consult each said memory storage means address position and produce a train of electrical pulses corresponding to said indicia stored therein; means controlling said memory retrieval means for providing addressed access to said memory storage means; reference coordinate determination means adapted to search the questioned pattern of contour lines for said reference coordinate comprising means for controlling said scanning means so as to direct a predetermined sequence of scanning centers, and means for controlling said scanning means so as to direct a predetermined sequence of radial scans at each said scanning center; pattern identification means adapted to repsond to location of a reference coordinate by said reference coordinate determination means by controlling said scanning means so as to make a series of scans having a known spatial relation to said reference coordinate; and comparator means adapted to compare the trains of pulses produced by said scanning means with the trains of pulses produced by said memory retrieval means when consulting said indicia stored in said memory storage means, first comparing the scanner trains of pulses to the first indicia train of pulses for reference coordinate correspondence, and then upon reference coordinate correspondence comparing the subsequent scanner trains of pulses to the second indicia trains of pulses for determination of whether the quesioned pattern matches the known pattern.

16. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having first stored indicia correlative to the train of electrical pulses produced by said scanning means along a known reference coordinate on the associated pattern of contour lines and providing second stored indicia correlative to the train of electrical pulses produced by said scanning means along further paths on said associated pattern of contour lines having a known spatial relation relative to said reference coordinate; memory retrieval means adapted to consult each said memory storage means address position and produce a train of electrical pulses corresponding to said indicia stored therein; means controlling said memory retrieval means for providing addressed access to said memory storage means; reference coordinate determination means adapted to search the questioned pattern of contour lines for said reference coordinate comprising means for controlling said scanning means so as to direct a predetermined outward spiral sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of scans having a known spatial relation to said reference coordinate; and comparator means adapted to compare the trains of pulses produced by said scanning means with the trains of pulses produced by said memory retrieval means when consulting said indicia stored in said memory storage means, first comparing the scanner trains of pulses to the first indicia train of pulses for reference coordinate correspondence, and then upon reference coordinate correspondence comparing the subsequent scanner trains of pulses to the second indicia trains of pulses for determination of whether the questioned pattern matches the known pattern.

17. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having first stored indicia correlative to the train of electrical pulses produced by said scanning means along a known reference coordinate on the associated pattern of contour lines and providing second stored indicia correlative to the train of electrical pulses produced by said scanning means along further paths on said associated pattern of contour lines having a known spatial relation relative to said reference coordinate; memory retrieval means adapted to consult each said memory storage means address position and produce a train of electrical pulses corresponding to said indicia stored therein; means controlling said memory retrieval means for providing addressed access to said memory storage means; reference coordinate determination means adapted to search the questioned pattern of contour lines for said reference coordinate comprising means for controlling said scanning means so as to direct a predetermined outward spiral sequence of scanning centers, and means for controlling said scanning means so as to direct a predetermined sequence of radial scans at each said scanning center; pattern identification means adapted to respond to location of a reference coordinate by said reference coordinate determination means by controlling said scanning means so as to make a series of radial scans from the same center as the reference coordinate and having a predetermined angular spacing therefrom; and comparator means adapted to compare the trains of pulses produced by said scanning means with the trains of pulses produced by said memory retrieval means when consulting said indicia stored in said memory storage means, first comparing the scanner trains of pulses to the first indicia train of pulses for reference coordinate correspondence, and then upon reference coordinate correspondence comparing the subsequent scanner trains of pulses to the second indicia trains of pulses for determination of whether the questioned pattern matches the known pattern.

18. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having indicia correlative to a plurality of predetermined scanning paths having a certain common starting point on said known pattern of contour lines, one of said scanning paths constituting a known reference coordinate; memory retrieval means adapted to consult each said memory storage means address position and produce a train of electrical pulses for the indicia correlative to each scanning path stored therein; addressing means for providing an addressed command to said memory retrieval means so as to call up for comparison anyone of said address positions in said memory storage means; reference coordinate determination means adapted to search the questioned pattern of contour lines for said reference coordinate comprising scanning control means adapted to direct said scanning means in a predetermined preliminary sequence of spaced scans, each of said scans having a first common starting point, and to repeat said sequence of spaced scans a predetermined number of times with different starting points; pattern identification means adapted to respond to location of the reference coordinate by said reference coordinate determination means by controlling said scanning means so as to make a series of identification scans from the same starting point as the reference coordinate and having a predetermined series of orientations thereto; and comparator means adapted to compare the train of pulses produced by said scanning means during said preliminary scans with the train of pulses produced by the indicia correlative to said reference coordinate for correspondence therebetween, and further adapted in subsequent identification scans having said predetermined orientation to said reference coordinate to compare the train of pulses produced by said scanning means for each scan path with the train of pulses produced by said memory retrieval means from the indicia in said memory storage means corresponding to that scan path for determination of whether the questioned pattern matches the known pattern.

19. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having indicia correlative to a plurality of predetermined radii having a certain common center on said known pattern of contour lines, one of said radii constituting a known reference coordinate; memory retrieval means adapted to consult each said memory storage means address position and produce a train of electrical pulses for the indicia correlative to each radii stored therein; addressing means for providing an addressed command to said memory retrieval means so as to call up for comparison anyone of said address positions in said memory storage means; reference coordinate determination means adapted to search the questioned pattern of contour lines for said reference coordinate comprising scanning control means adapted to direct said scanning means in a predetermined preliminary sequence of spaced radial scans, each of said scans having a first common center, and to repeat said sequence of spaced radial scans a predtermined number of times with different centers; pattern identification means adapted to respond to location of the reference coordinate by said reference coordinate determination means by controlling said scanning means so as to make a series of radial identification scans from the same center as the reference coordinate and having a predetermined angular spacing therefrom; and comparator means adapted to compare the train of pulses produced by said scanning means during said preliminary scans with the train of pulses produced by the indicia correlative to said reference coordinate radii for correspondence therebetween, and further adapted in subsequent identification scans having said predetermined angular spacing therefrom to compare the train of pulses produced by said scanning means for each scanned radii with the train of pulses produced by said memory retrieval means from the indicia in said memory storage means corresponding to that radii for determination of whether the questioned pattern matches the known pattern.

20. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having indicia correlative to a plurality of predetermined radii having a certain common center on said known pattern of contour lines, one of said radii constituting a known reference coordinate; memory retrieval means adapted to consult each said memory storage means address position and produce a train of electrical pulses for the indicia correlative to each radii stored therein; addressing means for providing an addressed command to said memory retrieval means so as to call up for comparison anyone of said address positions in said memory storage means; reference coordinate determination means adapted to search the questioned pattern of contour lines for said reference coordinate comprising scanning control means adapted to direct said scanning means in a predetermined preliminary sequence of spaced radial scans, each of said scans having a first common center, and to repeat said sequence of spaced radial scans a predetermined number of times with different centers, said different centers forming a matrix of centers starting at the centrally located portion of the field of scan of said scanning means; pattern identification means adapted to respond to location of the reference coordinate by said reference coordinate determination means by controlling said scanning means so as to make a series of radial identification scans from the same center as the reference coordinate and having a predetermined angular spacing therefrom; and comparator means adapted to compare the train of pulses produced by said scanning means during said preliminary scans with the train of pulses produced by the indicia correlative to said reference coordinate radii for correspondence therebetween, and further adapted in subsequent identification scans having said predetermined angular spacing therefrom to compare the train of pulses produced by said scanning means for each scanned radii with the train of pulses produced by said memory retrieval means from the indicia in said memory storage means corresponding to that radii for determination of whether the questioned pattern matches the known pattern.

21. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having indicia correlative to a plurality of predetermined radii having a certain common center on said known pattern of contour lines, one of said radii constituting a known reference coordinate; memory retrieval means adapted to consult each said memory storage means address position and produce a train of electrical pulses for the indicia correlative to each radii stored therein; addressing mean for providing an addressed command to said memory retrieval means so as to call up for comparison any one of said address positions in said memory storage means; reference coordinate determination means adapted to search the questioned pattern of contour lines for said reference coordinate comprising scanning control means adapted to direct said scanning means in a predetermined preliminary sequence of spaced radial scans, each of said scans having a first common center, and to repeat said sequence of spaced radial scans a predetermined number of times with different centers, said different centers forming an outward spiral; pattern identification means adapted to respond to location of the reference coordinate by said reference coordinate determination means by controlling said scanning means so as to make a series of radial identification scans from the same center as the reference coordinate and having a predetermined angular spacing therefrom; and comparator means adapted to compare the train of pulses produced by said scanning means during said preliminary scans with the train of pulses produced by the indicia correlative to said reference coordinate radii for correspondence therebetween, and further adapted in subsequent identification scans having said predetermined angular spacing therefrom to compare the train of pulses produced by said scanning means for each scanned radii with the train of pulses produced by said memory retrieval means from the indica in said memory storage means corresponding to that radii for determination of whether the questioned pattern matches the known pattern.

22. Contour pattern identification apparatus for determining whether a questioned pattern of contour lines submitted thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having indicia correlative to the train of electrical pulses produced by said scanning means when scanning along a plurality of predetermined radii having a certain common center on said known pattern of contour lines, one of said radii constituting a known reference coordinate; memory retrieval means adapted to consult each said memory storage means address position and produce a train of electrical pulses for the indicia correlative to each radii stored therein; addressing means for providing an addressed command to said memory retrieval means so as to call up for comparison anyone of said address positions in said memory storage means; reference coordinate determination means adapted to search the questioned pattern of contour lines for said reference coordinate comprising scanning control means adapted to direct said scanning means in a predetermined preliminary sequence of spaced radial scans, each of said scans having a first common center, and to repeat said sequence of spaced radial scans a predetermined number of times with different centers, said different centers forming an outward square spiral; pattern identification means adapted to respond to location of the reference coordinate by said reference coordinate determination means by controlling said scanning means so as to make a series of radial identification scans from the same center as the reference coordinate and having a predetermined angular spacing therefrom; and comparator means adapted to compare the train of pulses produced by said scanning means during said preliminary scans with the train of pulses produced by the indicia correlative to said reference coordinate radii for correspondence therebetween, and further adapted in subsequent identification scans having said predetermined angular spacing therefrom to compare the train of pulses produced by said scanning means for each scanned radii with the train of pulses produced by said memory retrieval means from the indicia in said memory storage means corresponding to that radii for determination of whether the questioned pattern matches the known pattern.

23. Contour pattern identification apparatus for determining whether a questioned pattern of contour lines submited thereto is known comprising scanning means adapted to scan said questioned pattern of contour lines and produce a train of electrical pulses correlative to the scanning path; memory storage means providing a plurality of address positions, each said position being correlative to a separate known pattern of contour lines and each said position having indicia correlative to the train of electrical pulses produced by said scanning means when scanning along a plurality of predetermined radii having a certain common center on said known pattern of contour lines, one of said radii constituting a known reference coordinate; memory retrieval means adapted to consult each said memory storage means address position and produce a train of electrical pulses for the indicia correlative to each radii stored therein; addressing means for providing an addressed command to said memory retrieval means so as to call up for comparison anyone of said address positions in said memory storage means; reference coordinate determination means adapted to search the questioned pattern of contour lines for said reference coordinate comprising scanning control means adapted to direct said scanning means in a predetermined preliminary sequence of spaced radial scans, each of said scans having a first common center, and to repeat said sequence of spaced radial scans a predetermined number of times with different centers, said different centers forming an outward square spiral; pattern identification means adapted to respond to location of the reference coordinate by said reference coordinate determination means by controlling said scanning means so as to make a series of radial identification scans from the same center as the reference coordinate and having a predetermined angular spacing therefrom; and comparator means adapted to compare the train of pulses produced by said scanning means during said preliminary scans with the train of pulses produced by the indicia correlative to said reference coordinate radii for correspondence therebetween and to stop said preliminary scans when said reference coordinate has been scanned and ascertained, and further adapted in subsequent identification scans having said predetermined angular spacing therefrom to compare the train of pulses produced by said scanning means for each scanned radii with the train of pulses produced by said memory retrieval means from the indicia in said memory storage means corresponding to that radii for determination of whether the questioned pattern matches the known pattern.

24. Contour pattern identification apparatus for determining whether a questioned human fingerprint pattern of contour ridge lines submitted thereto is known comprising scanning means adapted to scan said questioned fingerprint and produce a train of electrical pulses correlative to the scanning path; memory storage means providing a plurality of address positions, each said position being correlative to a separate known fingerprint and each said position having indicia correlative to the train of electrical pulses produced by said scanning means when scanning along a plurality of predetermined radii having a certain common center on said known fingerprint, one of said radii constituting a known reference coordinate; memory retrieval means adapted to consult each said memory storage means address position and produce a train of electrical pulses for the indicia correlative to each radii stored therein; addressing means for providing an addressed command to said memory retrieval means so as to call up for comparison the address position in said memory storage means corresponding to the purported identity of said questioned fingerprint, coordinate determination means adapted to search the questioned fingerprint for said reference coordinate comprising scanning control means adapted to direct said scanning means in a predetermined preliminary sequence of spaced radial scans, each of said scans having a first common center, and to repeat said sequence of spaced radial scans a predetermined number of times with different centers, said different centers forming an outward square spiral; pattern identification means adapted to respond to location of the reference coordinate by said reference coordinate determination means by controlling said scanning means so as to make a series of radial identification scans from the same center as the reference coordinate and having a predetermined angular spacing therefrom; and comparator means adapted to compare the train of pulses produced by said scanning means during said preliminary scans with the train of pulses produced by the indicia correlative to said reference coordinate radii for correspondence therebetween and to stop said preliminary scans when said reference coordinate has been scanned and ascertained, and further adapted in subsequent identification scans having said predetermined angular spacing therefrom to compare the train of pulses produced by said scanning means for each scanned radii with the train of pulses produced by said memory retrieval means from the indicia in said memory storage means corresponding to that radii for determination of whether the questioned fingerprint matches the known fingerprint.

References Cited by the Examiner

UNITED STATES PATENTS

| | | | |
|---|---|---|---|
| 2,838,602 | 6/1958 | Sprick | 340—146.3 |
| 3,202,965 | 8/1965 | Nadler | 340—146.3 |

MAYNARD R. WILBUR, *Primary Examiner.*

DARYL W. COOK, *Examiner.*

J. E. SMITH, *Assistant Examiner.*